United States Patent [19]

Samanta et al.

[11] 4,352,308

[45] Oct. 5, 1982

[54] METHOD OF CUTTING CAST IRON WITH $Si_3N_4$ COMPOSITE CUTTING TOOL MATERIAL

[75] Inventors: Shyam K. Samanta, Ypsilanti; Krishnamoorthy Subramanian, Inkster; Andre Ezis, Grosse Ile; David Moskowitz, Southfield, all of Mich.

[73] Assignee: Ford Motor Company, Dearborn, Mich.

[21] Appl. No.: 129,151

[22] Filed: Mar. 10, 1980

Related U.S. Application Data

[62] Division of Ser. No. 911,255, May 31, 1978.

[51] Int. Cl.³ .............................................. B23B 1/00
[52] U.S. Cl. .................................................... 82/1 C
[58] Field of Search .............. 407/119; 106/73.2, 73.4, 106/73.5; 264/332

[56] References Cited

U.S. PATENT DOCUMENTS

| | | | |
|---|---|---|---|
| 3,830,652 | 8/1974 | Gazza | 106/73.2 |
| 3,833,389 | 9/1974 | Komeya et al. | 407/119 |
| 3,835,211 | 9/1974 | Coe et al. | 264/332 |
| 3,977,061 | 8/1976 | Lindstrom et al. | 407/119 |
| 4,069,059 | 1/1978 | McDonough | 106/73.5 |
| 4,099,979 | 7/1978 | Lange et al. | 106/73.5 |
| 4,143,107 | 3/1979 | Ishi | 106/73.2 |

FOREIGN PATENT DOCUMENTS 52-31910 3/1977 Japan ...................................... 407/11

OTHER PUBLICATIONS

King, "Ceramics for Cutting Metals", Chem. Bul., vol. 43, No. 5, pp. 395–400, May 1964.
Smith, "Temperatures and Compositional Stability of a $Y_6Si_6O_2$ Phase in Oxidized $Si_3N_4$", Am. Chem. Soc., Sep.–Oct. 77, pp. 465–466.

*Primary Examiner*—Leonidas Vlachos
*Attorney, Agent, or Firm*—Joseph W. Malleck; Olin B. Johnson

[57] ABSTRACT

A method of machining cast iron by using a ceramic cutting tool of specific composition at specified removal rates which results in increased tool life.

8 Claims, 9 Drawing Figures

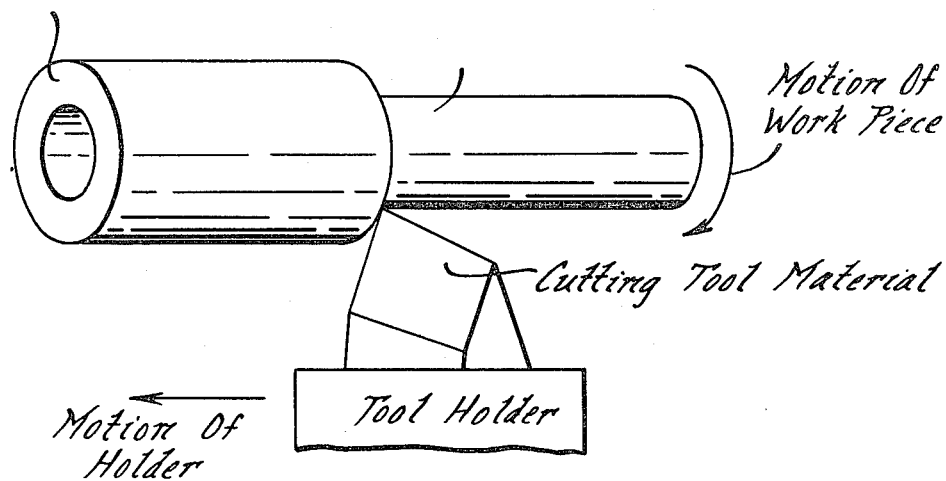
FIG. 1.
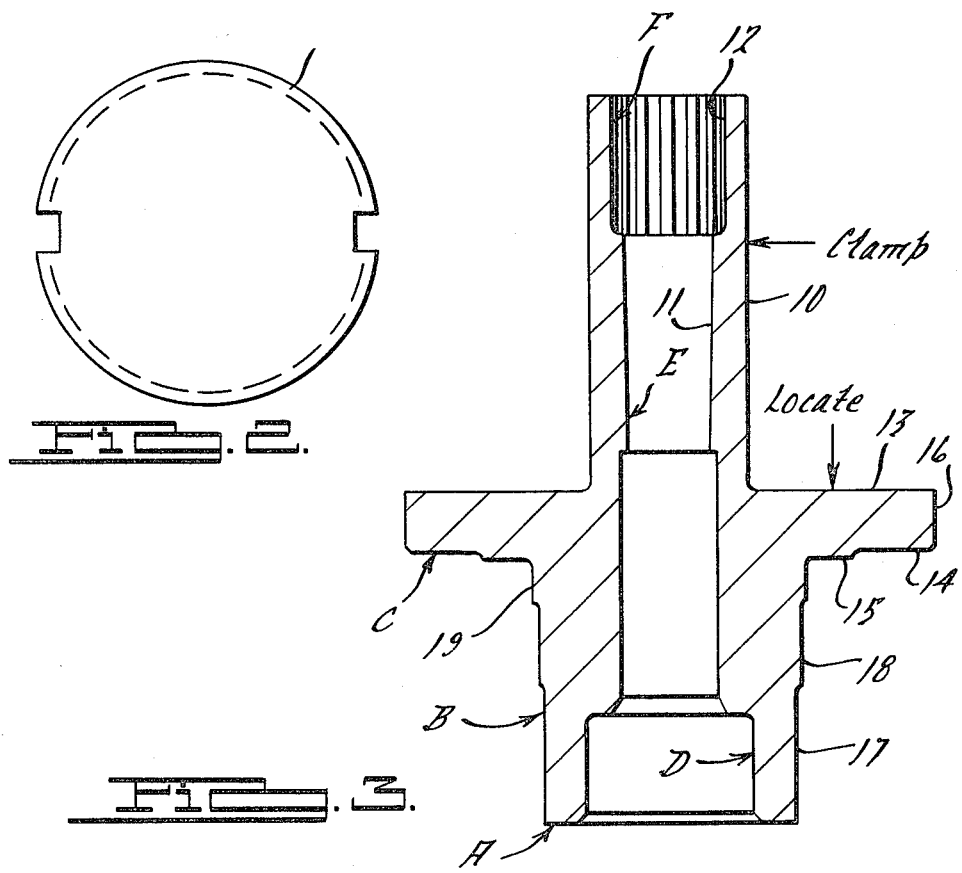
FIG. 2.
FIG. 3.

METHOD OF CUTTING CAST IRON WITH $Si_3N_4$ COMPOSITE CUTTING TOOL MATERIAL

This is a division of application Ser. No. 911,255, filed May 31, 1978.

BACKGROUND OF THE INVENTION

Recently, ceramics composed principally of silicon nitride ($Si_3N_4$) have found significant use as ceramic components for machines or as vessel coating. This material is known to have many good characteristics such as high oxidation resistance at high temperatures (1400° C.), good mechanican strength at high—1400 temperatures, and good hardness at high temperature.

Strength of this material is related to density and it has been found that the densification property of silicon nitride, sintered under atmospheric pressure, is very inferior. Therefore, it has been considered important to employ high pressure when a product of good strength is desired. This is routinely referred to as hot pressing of silicon nitride. However, in spite of the use of hot pressing, the bend strength of simple $Si_3N_4$ has not been as high as desired at high temperatures. Accordingly, other avenues of strength improvement have been sought such as through the use of additives which operate as a low temperature liquid phase to facilitate densification and not significantly imparing the creep resistance of the ceramic body at high temperatures. These added materials have included relatively large amounts of chromium oxide, zinc oxide, nickel oxide, titanium oxide, cerium oxide, magnesium oxide, yttrium oxide and others, ranging in excess of 20% (wt.) of the matrix material. Silicon nitride with these particular additives tends to form a structure having a strength level which does not usually exceed 50 KSI at high temperatures. In one instance (U.S. Pat. No. 3,830,652 to Gaza) did the prior art obtain strength levels in excess of 50 KSI. In this instance, the concern was for physical characteristics useful for turbine elements; hardness, oxidation resistance (inertness) and transverse rupture strength. Gaza explored metal oxide additives to a $Si_3N_4$ system which ranged in amounts related solely to machine element usage. The additions were added in amounts up to 20%.

However, commercial cutting tools today exhibit the same or better physical properties that were the focus of Gaza's work. For example, commercial $Al_2O_3$ or TiC tools have excellent hardness at high temperatures and have high resistance to oxidation and have transverse rupture strengths at high temperatures which range up to 100,000 psi. Strength is considered the most important feature because of the necessity to withstand forces imposed on the tool material by the tool fixture and by the resistance of the stock material, particularly at heavy depths of cutting. These forces become unusually exaggerated when cutting ferrous material such as cast iron at high speeds and feeds. Without increased strength, it is believed by those skilled in the art that further improvements in tool life cannot be achieved. Since the strength level of $Si_3N_4$ is equal to or lower than commercial materials now available, it has been rejected as a tool material candidate with little hope in improving tool life.

In only one known instance has the art attempted to employ $Si_3N_4$ directly as a cutting tool material and this was for use only on hypereutectic aluminum alloys. This attempt is set forth in a Japanese Pat. No. 49-113803 (10-30-1974) by Kazutaka Ohgo, appearing in Chemical Abstracts, Volume 84, 1976, page 286 (84:21440t). In this work, silicon nitride was sintered (as opposed to hot pressing) and metal oxide spinels were employed in solid solution in the silicon nitride matrix. The spinels were formed by a mixture of divalent and trivalent metal oxides (including magnesium oxide and $Y_2O_3$). Only a quarternary system was employed involving $Si_3N_4$, $SiO_2$, MgO, and $Y_2O_3$. This produced many secondary phases which weakened the physical characteristics, particularly strength, thermal conductivity, and increased the thermal coefficient of expansion. A loss of these physical characteristics make it most difficult to obtain even equivalent performance to commercially available tools when applied to a rigorous cutting environment such as interrupted cutting on cast iron. The cutting operation was of very short duration (2 minutes) of continuous machining and at low metal removal rates (cutting speeds of 1000 sfm, 0.012 inches per rev. of feed and 0.060 inches of depth of cut and metal removal of 8.64 in.$^3$/min.). This type of test information, of course, did not investigate cutting applications where large forces are applied to the tool, did not investigate the elimination of spinel additives, did not investigate heavy cutting against rough surfaces such as cast iron, nor continuous cutting for periods of several hours or greater, nor did it explore intermittent, interrupted high speed cutting at speeds of 4000–5000 sfm at heavy feeds and depths of cutting. The demonstrated wear of 0.006–0.008 inches, in Ohgo's work, for 2 minutes of cutting time is highly excessive when compared to the goals of the present invention. Therefore, this work did not demonstrate that $Si_3N_4$ possessed sufficient characteristics to be used as a tool material on ferrous materials which apply large bend forces to the tool.

Moreover, the art has been possessed of sufficient knowledge in the making of $Si_3N_4$ with additives for many years; during this long term no effort was made to apply this material as a cutting tool against cast iron. This tends to support the contention of this invention that if tool life is dramatically increased for certain $Si_3N_4$ composites when used for machining cast iron, there must be some unobvious characteristics independent of strength that layed undiscovered to promote this new use.

This invention has discovered a correlation between a thermal shock parameter and promotion of prolonged life in $Si_3N_4$ materials when used as a cutting tool on cast iron. This parameter consists of $(KS/\alpha E)$ where K is thermal conductivity of the material, S is the modulus of rupture, $\alpha$ the coefficient of thermal expansion, and E is Young's modulus. E can be eliminated from the parameter since it remains substantially constant for the contemplated variation in ceramic chemistry which controls this parameter. This parameter must exceed 26 lbs/in.$^2$ as minimal if significant improvement in tool life is to be obtained. It has been further discovered that a simple ternary ceramic system ($Si_3N_4.SiO_2$. low temp. liquid phase) with $SiO_2$ present, not as an additive, but as an inherent reaction product of heating $Si_3N_4$, serves as the proper mechanism for achieving the required thermal shock parameter. The low temperature liquid phase must be one which produces a small amount of a highly refractory silicate which will reside totally in the grain boundary of the matrix.

There are many other physical characteristics beyond its thermal shock parameter that should be improved in silicon nitride if it is to be successful as a tool material for cutting cast iron. As indicated earlier, the densification of the material has been a point of concern and has been alleviated by use of hot pressing techniques and oxide additives. This has permitted the density to be elevated close to theoretical density, but improving density by itself through increasing amounts of oxide leads to a decrease in several other physical properties. Investigators have failed to perceive this interplay of physical characteristics.

More importantly, known silicon nitride compositions, when used as a cutting tool against relatively rough surfaces such as cast iron, exhibit a failure mode under such circumstances is typically due to thermal shock as opposed to the more desirable mode by wear. Further the attainable hardness level and general rigidity of the known silicon nitride composites have yet to be comparable to commercial cutting tools.

SUMMARY OF THE INVENTION

A primary object of this invention is to provide an improved cutting tool (and method of making same) useful for cutting cast iron, which tool and method provides for a significant increase in the wear life of the tool.

Another object is to provide an unobvious new use of $Si_3N_4$ for successfully cutting rough ferrous materials particularly cast iron, under severe interrupted cutting conditions. Still another object of this invention is to provide an improved cutting tool (and method of making same) which exhibits a failure mode by wear and not by fraction or thermal cracking, when used to cut cast iron. A specific object is to provide an improved method of making cutting tools which requires (a) blending of a $Si_3N_4$ base powder and a metal oxide powder selected from (4–12%) $Y_2O_3$ or $ZrO_2$, or (1–5% Mgo), (b) hot pressing said blended powders using the following parameters 5,000–6,500 psi, 3–8.5 hours, and temperature of 1700°–1750° C., and (c) cooling the hot pressed body without pressure at an average rate of 100° C./hr.

Pursuant to these objects, the following inventive features have been found necessary: (a) formulation of a ($Si_3N_4.SiO_2$. metal oxide) ceramic system which exhibits a thermal shock parameter at 1200° C. which is at least $$26 \times 10^9 \frac{BTU - lbs}{Hr(in^3)},$$

and a thermal shock parameter at room temperature which is at least $$220 \times 10^9 \frac{BTU - lbs}{Hr(in^3)}$$

(b) regulating the ceramic system to avoid the presence of a spinel oxide and to insure formation of a low temperature liquid phase effective to form a highly refractory silicate residing only in the grain boundaries of the $Si_3N_5$ matrix; and (c) regulating both the processing of the ceramic system and the formulation of the system to provide a combination of specific physical characteristics in the material including: physical strength (as measured in a 4-point bend test) which is at least 70,000 psi at 700° C., a hardness level which is at least 86 using the Rockwell 45-N standard, a density of at least 3.25 g/cm$^3$, a coefficient of thermal expansion which is no greater than $1.88 \times 10^{-6}$ in/in °F. at 1200° C., a thermal conductivity level of at least 0.727 BTU/HR in °F. at 1200° C., and a modulus of elasticity no greater than $55.3 \times 10^6$ psi.

DESCRIPTION OF THE DRAWINGS

FIG. 1 is a perspective view of the work stock employed in a first set of laboratory cutting operations requiring continuous cutting simulation;

FIG. 2 is an end view of a work stock similar to FIG. 1 illustrating the mode to simulate interrupted cutting;

FIG. 3 is central sectional view of a stator support casting used the stock material for production machining examples;

FIG. 4 depicts the front face side and FIG. 5 depicts the rear spindle side;

DETAILED DESCRIPTION

Figures 4, 5:
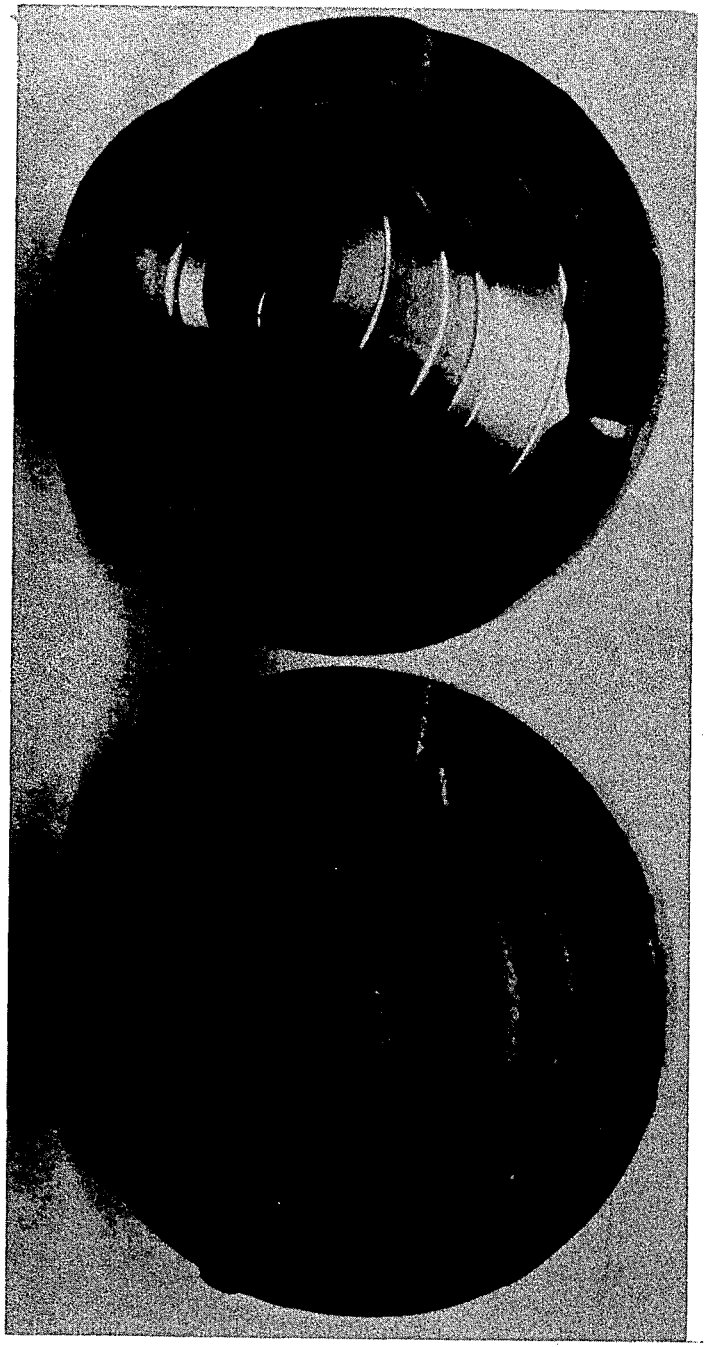
FIGS. 4 and 5 are before machining and after machining photographs of the actual casting of FIG. 3.

The tendency toward higher speeds and feeds to achieve lower production costs and higher productivity imposes an ever increasing demand for greater wear life on cutting tools. The temperature rise at the tool tips at these speeds and feeds is very high. Tool materials have to be inert at such working temperatures and their dynamic properties have to be superior than those of existing tool materials.

In accordance with this invention, it has been discovered that $Si_3N_4$, when combined with critically controlled amounts of certain metal oxides in a narrow volume fraction range, then hot pressed under controlled temperature, pressure and time conditions, will produce a cutting tool composition for a simple ternary system ($Si_3N_4.SiO_2.Y_2O_3$) that can be utilized at high speeds and heavy feeds on cast iron and will exhibit high wear resistance and will fail by a mode of gradual wear rather than thermal fatigue or catashopic failure.

The cutting tool formulation meets the needs of a specific set of cutting conditions created by working on cast iron. The tip temperature of the tool will experience a temperature typically in the range of 600°–800° C. This temperature factor is important since it is high enough to create thermal shock sites in portions of the tool, but not high enough to create a serious oxidation erosion problem. When machining cast iron, the chip easily fragments keeping any hot chip normally away from the tool tip.

Due to the resistance of cast iron to cutting, large fixture forces must be applied to the tool to move it through the stock material. Moreover, the mass removal rates required in many cutting operations on cast iron is considerably greater than used with other stock materials. This necessitates a strong tool material with respect to transverse rupture strength. All tool designers consider this latter aspect the most important consideration with respect to evaluating the success of a new tool material.

The three virtues normally recognized of $Si_3N_4$ would not suggest to one skilled in the art that it would be a successful candidate for machining cast iron. Its transverse rupture strength at high temperature rarely exceeded 50,000 psi (while commercial tools regularly experienced strength levels of 100,000-200,000 psi); its high oxidation resistance was not critically needed; and its good hardness at high temperature was easily exceeded by the hardness of commercially available silicon carbide tools.

The present invention recognized for the first time the role played by thermal shock resistance factors, namely, the coefficient of thermal expansion ($\alpha$) and thermal conductivity (K) related to the modulus of rupture (S). This is defined herein by the expression (KS/$\alpha$E) where E is Young's modulus and can be eliminated because it remains substantially constant under varying cutting conditions and material variations. By maintaining this thermal shock parameter above $$26 \times 10^9 \frac{BTU - lbs}{Hr(in^3)},$$

it has been determined that a significant increase in wear life can be achieved on cast iron. It is difficult to theorize why this phenomenon takes place, but it may be due to the greater structural stability that is achieved by the ceramic at 700° C. when generated heat is quickly conducted away preventing a large temperature gradient in the tool which leads to cracking if the material has an undesirable coefficient of thermal expansion; this may more readily be experienced when the tool tip is slightly cooled by intermittent or interrupted cutting.

A preferred method for making such a cutting tool is as follows:

(1) A first powder of substantially alpha phase silicon nitride is prepared having less than 1.0% cation impurities (excluding free silicon), about 1% free silicon, and about 0.7% by weight oxygen.

(2) A second powder of one or more selected metal oxides is prepared. The metal oxides are selected from a group consisting of $Y_2O_3$, MgO, and $ZrO_2$. These metal oxides are characterized by their small atom size and their affinity to form a low temperature liquid phase which solidifies as a highly refractory silicate residing solely within the grain boundaries of the matrix. The oxides must be simple; it is important to avoid the formation of spindles which will produce weaker secondary phases.

(3) The first and second powders are blended and mixed in a prescribed proportion. The second powder should have a weight percent of 1-15%. However, the ingredients of the second powder must fall within the following ranges:

0.75-5% MgO, 4-12% $Y_2O_3$, and 1-13% $ZrO_2$.

(4) The powder mixture is heated to a temperature level of 1700°-1750° C. (operably 1600°-1800° C.) for a period of 3.0-6.8 hours (operably 1-8 hrs.) under a pressure of 5,000-6,500 psi (operably 1,000-8,000 psi), and allowed to cool at an average rate of 100° C./hr. The hot pressed compact will exhibit substantially complete Beta phase silicon nitride.

The resulting product must exhibit the following combination of physical characteristics:

(a) 100% theoretical density (zero porosity);
(b) a thermal shock parameter of at least $$26 \times 10^9 \frac{BTU - lbs}{Hr (in^3)}$$

(c) a transverse rupture strength at 1200° C. (in 4-point bending) of at least 67,000 psi;

(d) a hardness level of at least 86 Rockwell 45-N;
(e) a measured density of at least 3.25 g/cm³;
(f) a wear life characterized by measured wear of no greater than 0.010" after one hour of continuous cutting of cast iron at a mass removal rate of at least 25 in³/min or mechanical failure under cutting conditions prescribes by at least 2000 feet per minute with a depth of cut of at least 0.06 inches and a rate of feed of at least 0.012 inches per IPR;
(g) the absence of tool failure by fracture or chipping.

EXAMPLE I

A sample cutting tool material (identified as Sample 1) was prepared employing hot pressed silicon nitride with 7.47 weight percent $Y_2O_3$ (8% $Y_2O_3$ was added as a powder to a powder having 85% alpha phase $Si_3N_4$); the powder mixture was hot pressed at a temperature 1740° C. under 6500 psi ($9.55 \times 10^6$ kilogram/cm²) for a period of 6½ hours. The pieces of hot pressed material were ground to a tool geometry of SNG 434 and the edges were prepared with 0.006"×30° K. land (chamfer). Each of the cutting tool prepared from this material were subjected to a cutting sequence on a simple cylindrical cast iron casting which varied between continuous, intermittent, or interrupted. As shown in FIG. 1, the continuous cutting consisted of generating cylindrical surface 10 at a prescribed speed, feed and depth of cut. Due to the expanded length of the cylinder 11, the tool tip experiences a relatively constant high temperature for the duration of the pass. Intermittent cutting consisted of withdrawing the tool intermittently along a longitudinal pass. Interrupted cutting consisted of passing the tool circumferentially about the cylinder along a path 12 (as shown in FIG. 2) which path encounters the previously cut longitudinal grooves. The latter provides repeated impacts for the tool.

Each type of cutting style imposes a different thermal condition on the tool which affects tool life in different ways. Other tool material samples were similarly prepared with different chemistries, as shown in Table I, along with their resultant physical properties.

The cutting operation for all these samples was carried out in a laboratory environment at a variety of speeds and varying feed rates at a constant depth of cut; the tool geometry was varied only in the corner configuration as indicated. The wear in inches was measured for specific period of time. The results of such cutting are shown in Table II. None of the tools were used to full life; the cutting time was terminated when a significant increase in tool life was perceived. Five minutes, under high cutting speeds (3,000-4,000 sfm) was deemed an unusually high increase in life when compared to commercial tools which typically fail after one minute.

It is believed that optimization of the thermal shock parameter of $Si_3N_4$ under extreme temperature conditions has led to this increase in tool life. The ability to have a stable structure at 600°-800° C. temperature while under severe stress along with the ability to effectively conduct away heat preventing a loss in high temperature strength provides the basis for this life improvement. These physical characteristics are critically affected by the compositional phase of the $Si_3N_4$ composite. It is most important that the selected additives form a highly stable refractory silicate which resides totally in the grain boundary of the matrix.

EXAMPLE II

Substantially the same cutting tool materials, prepared as indicated from Example I, were prepared for cutting use in a production environment with actual production machines at Ford Motor Company's machining plants. The casting to be machined was a difficult production vehicle casting (stator support) in some cases and an engine block in others; the stator support is shown in FIGS. 3, 4 and 5. For the stator support, continuous cutting was experienced at surfaces B and D, intermittent cutting at surface A, and interrupted cutting at surfaces C and F (see FIG. 4).

These sample materials were run under a variety of cutting conditions as set forth in Table III. All tool materials were run to failure which is measured by the number of pieces produced up to that failure event. Failure herein is defined (as regularly as accepted in the industry) to mean loss of workpiece tolerance or failure by fracture or chipping.

From the data in Tables II and III, we have discovered that controlled processing of $Si_3N_4$ with $Y_2O_3$, MgO, or ZrO provides the kind of thermal shock parameter that leads to longer tool life when machining cast iron at large mass removal rates or high speed. These metal oxides operate upon the controlled free silica to form a highly stable refractory silicate which resides totally in the grain boundary of the $Si_3N_4$ matrix.

Table III proceeds from lower cutting speeds to higher speeds with comparative materials grouped adjacent each other. For each comparison the inventive samples render significant increases in tool life.

The inventive materials perform 3–8 times better than the current commercial tools. In finish machining of the front end of an engine block, the number of blocks milled were 2100 pieces per corner with a depth of cut of 0.065 inch. Whereas using commercially available ceramics with half of that feed rate, the number is 600 pieces. The inventive material will provide (a) increased production at current cutting conditions, (b) increased production capacity at higher cutting speeds and feeds, (c) savings in tool material cost, (d) reduction in tool change downtime, and (e) increased production capacity leading to free machine time for preventive maintenance.

Figures 6, 7:
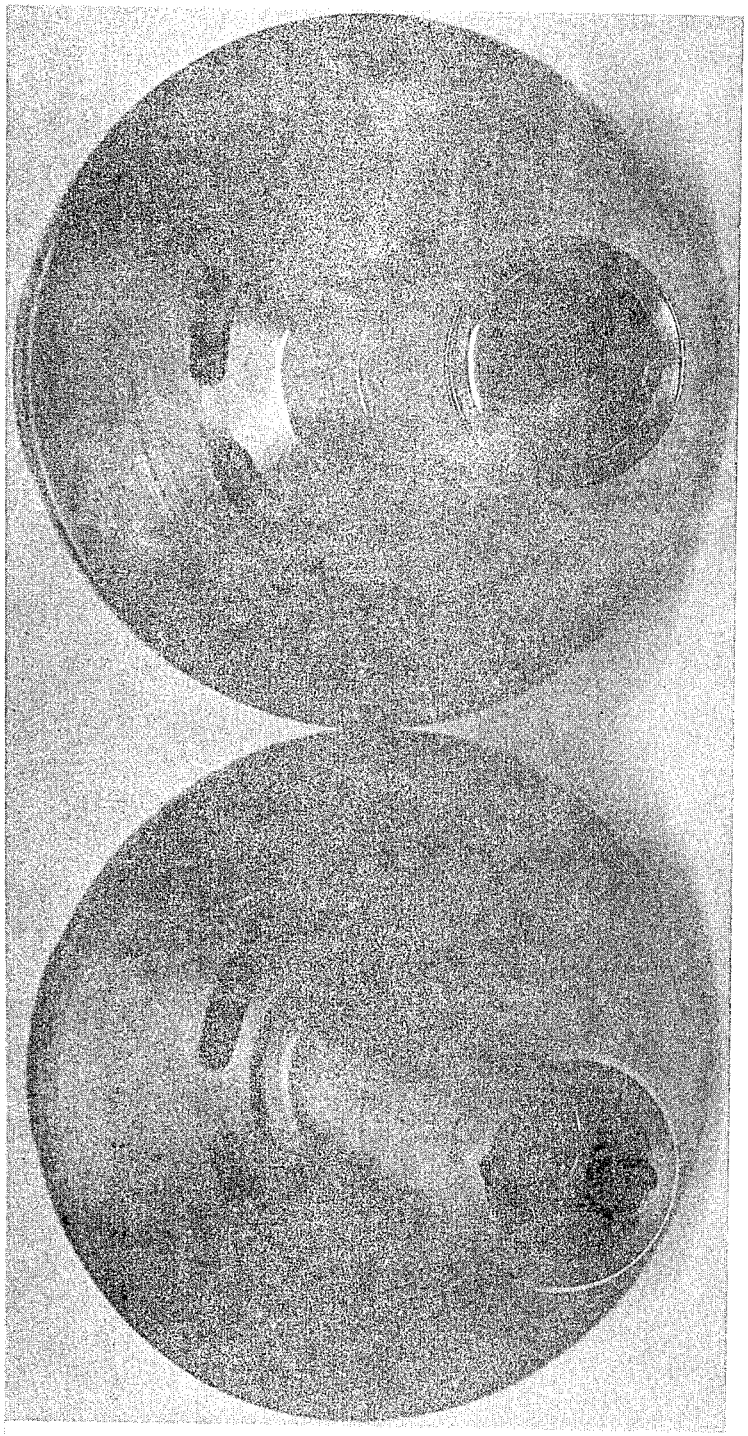
FIG. 6 is a graphical illustration of wear life to failure vs. thermal shock parameter employing the invention.
FIG. 7 is a graphical illustration of wear life to failure vs. $Y_2O_3/SiO_2$ ratio.
Figure 8:
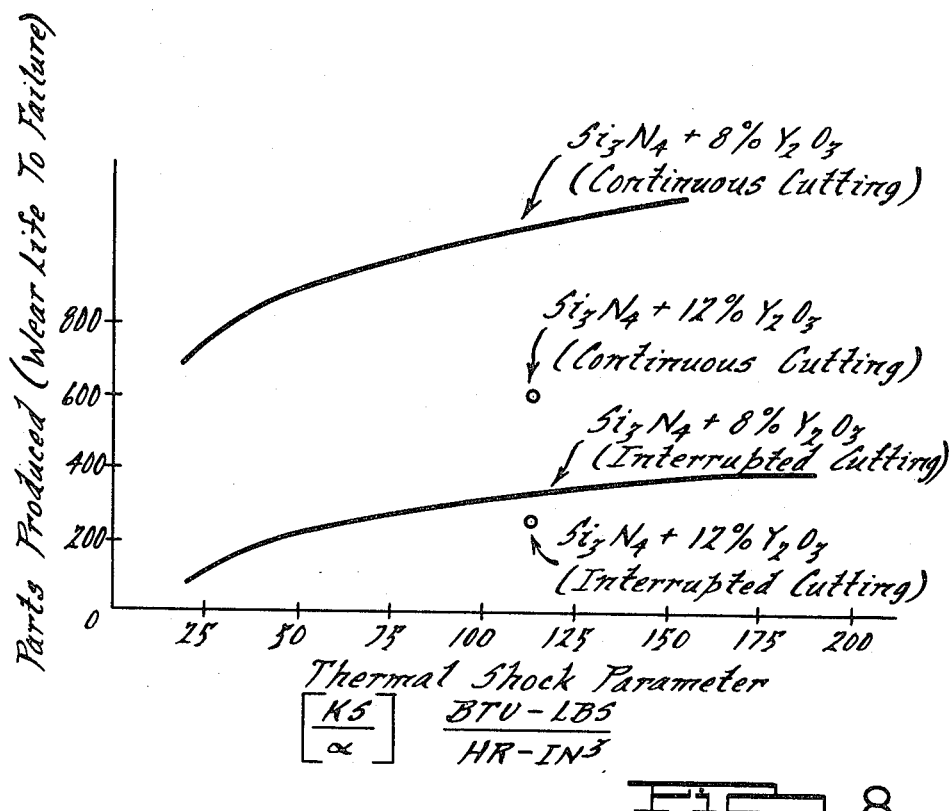
Figure 9:
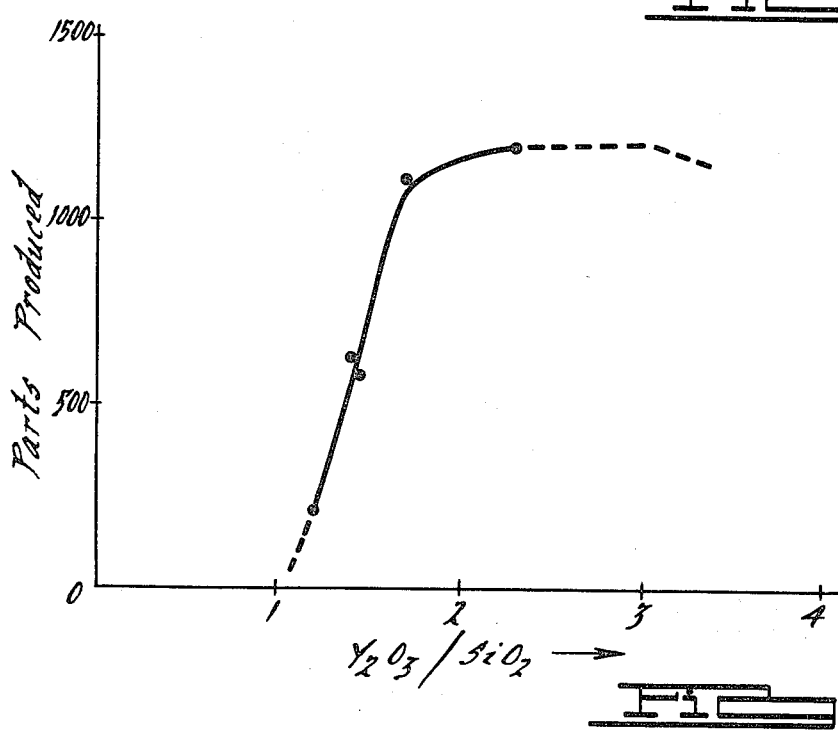

To obtain at least a four-fold increase in tool life over commercially available tool materials the $Si_3N_4.SiO_2.Y_2O_3$ ternary system must be employed with $Y_2O_3$ controlled to a limit of 7–9%. In this manner the thermal shock parameters can be optimized at either continuous or interrupted cutting conditions. FIG. 6 and Table IV portrays the role played by the thermal shock parameter.

Additionally, $Y_2O_3/SiO_2$ ratio must exceed 1.60. The influence of the $Y_2O_3/SiO_2$ ratio is portrayed in FIG. 7 and Table V.

TABLE I

| Material Sample | S, Transverse Rupture Strength (4-Point Bending), KSI Room Temp. | 1200° C. | Hardness Room Temp. Rockwell 45-N | Density gm/cm³ | α, Coefficient of Thermal Expansion, $\times 10^{-6}$ in/in° F. Room Temp. | 1200° C. | K, Thermal Conductivity, BTU/Hr in ° F. Room Temp. | 1200° C. | BTU-lbs. Hr (in³) $\frac{KS}{\alpha}$, Thermal Shock Factor Room Temp. | 1200° C. | E (Young's Modulus $10^6$ psi) |
|---|---|---|---|---|---|---|---|---|---|---|---|
| Sample No. 1 $Si_3N_4 + 8\%\ Y_2O_3$ | 103.6 | 105.7 | 87.6 | 3.4 | 0.87 | 1.87 | 3.23 | 3.23 | 179 | 182 | 53 |
| Sample No. 2 $Si_3N_4 + 11$–$12\%\ Y_2O_3$ | 115 | 70 | 87.0 | 3.398 | 1.5 | 2.7 | 4.4 | 4.4 | 337 | 114 | 51 |
| Sample No. 3 $Si_3N_4 + 5\%\ MgO$ | 85 | 67 | 86.3 | 3.272 | 84 | 1.84 | 1.917 | .727 | 194 | 26 | 55.3 |
| Sample No. 4 $Si_3N_4 + 5\%\ MgO$ | 129 | 87.4 | 89.2 | 3.25 | .74 | 1.74 | 1.917 | .727 | 334 | 36 | 54.7 |
| Sample No. 5 $Si_3N_4 + 15\%\ (885\%\ ZrO + 12\%\ Y_2O_3$ known as Zytrite) | Substantially equivalent properties to Sample 2. | | | | | | | | | | |
| Sample No. 6 $Si_3N_4 + 15\ (88\%\ ZrO + 12\%\ Y_2O_3 + 1.5$ Fe impurities known as modified Zytrite) | Substantially equivalent properties to Sample 2. | | | | | | | | | | |
| Sample No. 7 SIC (Prior Art) | | 93 | 91.5 | 3.29 | 1.53 | 2.57 | 4.09 | 1.71 | | | |
| $Al_2O_3$ (Prior Art) | 75 | 30 | 90.14 | 4.252 | 4.4 | 5.7 | 1.9 | 3 | 324 | 16 | 67 |

TABLE II

| Sample No. | Corner Configuration Number | Cutting Condition Speed (sfm) | Feed (ipr) | Depth of cut (in.) | Mass of Material Removed in³/min | Time (MIN) or (min-sec) | Tool Wear (Inches) Flank | Crater | Thermal and Mechanical Cracks |
|---|---|---|---|---|---|---|---|---|---|
| Continuous Cutting | | | | | | | | | |
| 1A | 1 | 4000 | .010 | .100 | 48 | 5.2 | none | none | NIL |
| 1B | 3 | 3000 | .020 | .100 | 72 | 5.7 | none | none | NIL |
| 1C | 1 | 3000 | .010 | .100 | 36 | 17.5 | none | none | NIL |
| 1D | 1 | 2000 | .0111 | .100 | 26.4 | 43.7 | none | none | NIL |
| 1E | 3 | 1000 | .0222 | .100 | 26.4 | 26.8 | none | none | NIL |
| 1F | 2 | 750 | .029 | .100 | 26.4 | 11.7 | none | none | NIL |

TABLE II-continued

| Sample No. | Corner Configuration Number | Cutting Condition Speed (sfm) | Feed (ipr) | Depth of cut (in.) | Mass of Material Removed in³/min | Time (MIN) or (min-sec) | Tool Wear (Inches) Flank | Crater | Thermal and Mechanical Cracks |
|---|---|---|---|---|---|---|---|---|---|
| 1G | 1 | 500 | .044 | .100 | 26.4 | 10.5 | none | none | NIL |
| 1H | 2 | 333 | .066 | .100 | 26.4 | 1.9 | none | none | Mechanical Fracture |
| 1I | 3 | 2000 | .011 | .100 | — | 21.0 | .015" | none | NIL |
| Intermittant Cutting | | | | | | | | | |
| 1K | 2 | 1000 | .011 | .100 | 13.2 | 2.3 | none | none | NIL |
| 1L | 5 | 750 | .029 | .100 | 26.4 | 1.1 | none | none | NIL |
| 1M | 6 | 750 | .044 | .100 | 39.6 | 0.6 | none | none | NIL |
| 1N | 7 | 500 | .011 | .100 | 6.6 | 4.1 | none | none | NIL |
| 1O | 4 | 2000 | .011 | .100 | 26.4 | 8.8 | none | none | NIL |
| 1P | 8 | 1000 | .022 | .100 | 26.4 | 7.7 | none | none | NIL |
| Interrupted Cutting | | | | | | | | | |
| 1Q | 6 | 1000 | .0111 | .100 | 13.2 | 3.7 | .0016" | NIL | NIL |
| 1R | 8 | 1000 | .0222 | .100 | 26.4 | 10.0 | .0013 | NIL | NIL |
| 1S | 7 | 2000 | .0111 | .100 | 26.4 | 10.5 | .0021 | NIL | NIL |
| Continuous Cutting | | | | | | | | | |
| 3A | 1(Trial 1) | 2000 | .0111 | .100 | 26.4 | 2.05 | .0055 | — | NIL |
| 3B | 3(Trial 2) | 2000 | .0111 | .100 | 26.4 | 9.95 | .0015" | — | NIL |
| 3C | 4 | 1000 | .0222 | .100 | 26.4 | 9.92 | .0018 | — | NIL |
| Interrupted Cutting | | | | | | | | | |
| 3D | 4 | 1000 | .0222 | .100 | 26.4 | 10.00 | | — | NIL |
| Continuous Cutting | | | | | | | | | |
| 4A | 1 | 2000 | .0111 | .100 | 26.4 | 9.65 | .002 | — | NIL |
| 4B | 2 | 1000 | .0222 | .100 | 26.4 | 10.5 | .001 | — | NIL |
| 5A | 2(Trial 1) | 2000 | .0111 | .100 | 26.4 | 9.82 | .0116 | — | NIL |
| 5B | 3(Trial 2) | 2000 | .0111 | .100 | 26.4 | 10.00 | .002 | — | NIL |
| 5C | 1 | 1000 | .0222 | .100 | 26.4 | 9.88 | .0019 | — | NIL |
| 6A | (Trial 1) | 2000 | .011 | .100 | 26.4 | 10.00 | .005 | — | NIL |
| 6B | (Trial 2) | 2000 | .011 | .100 | 26.4 | 5.15 | .002 | — | NIL |
| 6C | | 1000 | .022 | .100 | 26.4 | 10.10 | .002 | — | NIL |
| Continuous Cutting | | | | | | | | | |
| 7A | | 2000 | .0111 | .10 | 26.4 | 0.02" | Faction by Fracture | | Mechanical Fracture |
| 7B | | 1000 | .0222 | .10 | 26.4 | 0'15" | Faction by Fracture | | Mechanical Fracture |
| 7C | | 1000 | .0111 | .100 | 13.2 | 0'11" | Faction by Fracture | | Mechanical Fracture |

TABLE III

| Sample | Material | Cutting Operation | Tool Geometry | Cutting Conditions Speed (sfm) | Feed (ipr) | Depth of Cut (inches) | Work Pieces Produced before Failure |
|---|---|---|---|---|---|---|---|
| 1 | Hot Pressed Si₃N₄ + 8% Y₂O₃ | Broaching of Engine block Surface | SNG 636 | 150 | — | .02 | 1910 |
| 10 | (Prior Art Tool) WC | Broaching of Engine block Surface | " | 150 | — | .02 | 800 |
| 1 | Hot Pressed Si₃N₄ + 8% Y₂O₃ | Rough facing of Surface A (intermittent cutting) | SNG 434 | 496 | .016 | .125-.250 | 1200 |
| | Hot Pressed Si₃N₄ + 1% MgO | Rough facing of Surface A (intermittent cutting) | " | " | " | " | 800 |
| | Hot Pressed Si N + 5% MgO | Rough facing of Surface A (intermittent cutting) | " | " | " | " | 740 |
| | (Prior Art Tool) SiC base tool coated with Al₂O₃ | Rough facing of Surface A (intermittent cutting) | " | " | " | " | 150 |
| 1 | Hot Pressed Si₃N₄ + 8 Y₂O₃ | Semi finish and finish bore surface E (continuous cutting) | TPG 322 | 516 | .012-.006 | .025 | 1000 |
| | (Prior Art Tool) | Semi finish and finish bore | " | " | " | " | 250 |

TABLE III-continued

| Sample | Material | Cutting Operation | Tool Geometry | Cutting Conditions Speed (sfm) | Feed (ipr) | Depth of Cut (inches) | Work Pieces Produced before Failure |
|---|---|---|---|---|---|---|---|
|  | WC | surface E (continuous cutting) |  |  |  |  |  |
| 1 | Hot Pressed Si$_3$N$_4$ + Y$_2$O$_3$ | Semi-finish and finish bore surface F (spline hole) (Interrupted cutting) | TPG 322 | 516 | .0135–.006 | .025 | 320 |
| 1 | Hot Pressed Si$_3$N$_4$ + 8 Y$_2$O$_3$ | Rough face of Surface C (interrupted cutting) | TNG 434 | 965–496 | .012 | .093 | 420 |
|  | Hot Pressed Si$_3$N$_4$ + 1% MgO | Rough face of Surface C (interrupted cutting) | " | " | " | " | 140 |
|  | (Prior Art Tool) SiC base tool coated with Al$_2$O$_3$ | Rough face of Surface C (interrupted cutting) | " | " | " | " | 50 |
| 1 | Hot Pressed Si$_3$N$_4$ + 8 Y$_2$O$_3$ | Rough turning of outside diameter on surface B (continuous cutting) | TNG 434 | 998 | .014 | .0625 | 420 |
|  | (Prior Art Tool) SiC base tool coated with Al$_2$O$_3$ | Rough turning of outside diameter on surface B (continuous cutting) | " | " | " | " | 50 |
| 1 | Hot Pressed Si$_3$N$_4$ + 8 Y$_2$O$_3$ | Rough boring of inside diameter on surface D (continuous cutting) | TNG 434 | 1026 674 | .0189 to .0039 | .0625 | 157 |
|  | (Prior Art Tool) SiC base tool coated with Al$_2$O$_3$ | Rough boring of inside diameter on surface D (continuous cutting) | " | 1026 674 | .0189 to .0039 | " | 50 |
| 1 | Hot Pressed Si$_3$N$_4$ + 8% Y$_2$O$_3$ | Finish mill end of block (intermittent cutting) |  |  | .0043 (ipt) | .065 | 2100 |
|  | Al$_2$O$_3$ base + 5% TiN | Finish mill end of block (intermittent cutting) | " | 1026 674 | .0043 (ipt) | " | 400 |

TABLE IV

| Sample No. | Thermal Shock Parameter Room Temp. | $\frac{KS}{\alpha}$ High Temp. (1200° C.) | Parts Produced (Continuous Cutting) End Facing (A) | Interrupted Cutting) Flange Machine (B) |
|---|---|---|---|---|
| Si$_3$N$_4$ + 8% Y$_2$O$_3$ | 179 | 182 | 1200 | 420 |
| Si$_3$N$_4$ + 1% MgO | 334 | 36 | 800 | 140 |
| Si$_3$N$_4$ + 5% MgO | 220 | 26 | 740 | — |
| Si$_3$N$_4$ + 12% Y$_2$O$_3$ | 114 | 114 | 600 | 210 |
| Al$_2$O$_3$ |  | 16 | 200 | Fails by thermal cracking at outset |

K = Thermal Conductivity, BTU/Hr in °F.
S = Modulus of Rupture, KSI, (4-point bending).
$\alpha$ = Coefficient of Thermal Expansion, × 10$^{-6}$ in/in °F.

TABLE V

| Material | Cutting Condition Speed (sfm) | Feed (ipr) | Depth of Cut (in) | No. of Work Pieces Produced |
|---|---|---|---|---|
| Hot Pressed Si$_3$N$_4$ with 8% Y$_2$O$_3$; $\frac{Y_2O_3}{SiO_2}$ 2.3 | 496 | .016 | .125 to .250" | 1200 |
| Same; $\frac{Y_2O_3}{SiO_2} = 1.7$ | " | " | " | 1112 |
| Same $\frac{Y_2O_3}{SiO_2} = 1.41$ | " | " | " | 620 |
| Same; $\frac{Y_2O_3}{SiO_2} = 1.18$ | " | " | " | 200 |

TABLE V-continued

| Material | Cutting Condition | | | No. of Work Pieces Produced |
|---|---|---|---|---|
| | Speed (sfm) | Feed (ipr) | Depth of Cut (in) | |
| Hot Pressed Si$_3$N$_4$ with 11% Y$_2$O$_3$; $\frac{Y_2O_3}{SiO_2} = 1.45$ | " | " | " | 580 |

We claim:

1. A method of machining cast iron, comprising: deploying a ceramic as a cutting tool in continuous or interrupted machine cutting of cast iron at surface speeds of 50–7500 sfm and at depths of cut of at least 0.02 inches, wherein said ceramic cutting tool is a hot pressed Si$_3$N$_4$ based ceramic cutting tool containing only one metal oxide member of the group consisting of Y$_2$O$_3$, ZrO$_2$ and MgO.

2. The method of claim 1 in which said ceramic is limited to the ternary system of Si$_3$N$_4$.SiO$_2$ metal oxide and the ceramic is hot pressed to render a secondary binder phase in the grain boundary of the matrix providing a thermal shock parameter exceeding $$26 \times 10^9 \frac{BTU - lbs}{Hr(in^3)}.$$

3. A method of manufacturing cast iron, comprising: deploying a shaped ceramic as a cutting tool in continuous of interrupted machine cutting of solid cast iron stock at speeds of 50–7500 sfm, at a depth of cut of 0.2–0.25 inches and a feed of 0.01–0.044 in/rev, wherein said ceramic is a hot pressed Si$_3$N$_4$ based ceramic containing one ingredient selected from the group consisting of 4–12% Y$_2$O$_3$, 1–13% ZrO$_2$, 1–5% MgO, the pressure of pressing having been maintained continuously during heating at an ultimate pressing temperature of 1700°–1750° C. until substantially full density is obtained.

4. The method of claim 3, in which cutting is carried out for at least 20 minutes and said tool experiencing no thermal cracking or wear in excess of 0.01 inches.

5. The method of claim 3, in which said ingredient is ZrO$_2$ and the transverse rupture strength of said material is at least 70,000 psi at 1200° C.

6. The method of claim 5, in which said pressing is carried out for at least two hours at said temperature to effect a stable silicate phase in the grain boundary of said Si$_3$N$_4$ matrix, which phase serves as a binder and is inert to maintain the oxidation resistance of said material at a high level.

7. The method of claim 6, in which Si$_3$N$_4$ and said secondary phase binder combine to provide said material with a thermal shock parameter at 1200° C. of at least $$26 \times 10^9 \frac{BTU - lbs}{Hr(in^3)}.$$

8. A method of cutting cast iron, comprising: deploying a cutting tool consisting essentially of Si$_3$N$_4$ based ceramics containing a matrix of Si$_3$N$_4$ and a dispersion of SiO$_2$ and 4–12% Y$_2$O$_3$ or 1–13% ZrO$_2$ and having a predetermined silicate secondary phase to continuously or interruptedly cut solid cast iron for at least 30 minutes at speeds of 50–7500 sfm, at a depth of cut of at least 0.125 inches, said cutting being particularly characterized by the absence of tool material failure by either thermal cracking or wear of greater than 0.01 inch.

* * * * *